(12) United States Patent
Yu et al.

(10) Patent No.: US 9,069,714 B2
(45) Date of Patent: Jun. 30, 2015

(54) DEVICE INCLUDING AN EXTERNAL MEMORY CONNECTION UNIT CAPABLE OF ADOPTING AN EXTERNAL MEMORY

(75) Inventors: Hak-Soo Yu, Seongnam-si (KR);
Jun-Jin Kong, Yongin-si (KR);
Hyoung-Joon Kim, Seoul (KR);
Joo-Young Hwang, Suwon-si (KR);
In-Su Choi, Hwaseong-si (KR)

(73) Assignee: SAMSUNG ELECTRONICS CO., LTD., Samsung-ro, Yeongtong-gu, Suwon-si, Gyeonggi-do (KR)

(*) Notice: Subject to any disclaimer, the term of this patent is extended or adjusted under 35 U.S.C. 154(b) by 264 days.

(21) Appl. No.: 13/606,551

(22) Filed: Sep. 7, 2012

(65) Prior Publication Data

US 2013/0060985 A1 Mar. 7, 2013

(30) Foreign Application Priority Data

Sep. 7, 2011 (KR) .......................... 10-2011-0090460

(51) Int. Cl.
*G06F 13/14* (2006.01)
*G06F 13/16* (2006.01)
*G06F 13/38* (2006.01)

(52) U.S. Cl.
CPC .............. *G06F 13/16* (2013.01); *G06F 13/385* (2013.01)

(58) Field of Classification Search
USPC ................ 710/300–315, 8–19, 62–64, 72–73
See application file for complete search history.

(56) References Cited

U.S. PATENT DOCUMENTS

| | | | |
|---|---|---|---|
| 5,884,103 A * | 3/1999 | Terho et al. ..................... | 710/72 |
| 6,101,620 A | 8/2000 | Ranganathan | |
| 7,212,408 B2 | 5/2007 | Noble | |
| 2003/0023794 A1* | 1/2003 | Venkitakrishnan et al. .. | 710/105 |
| 2003/0225567 A1* | 12/2003 | Koch et al. ..................... | 703/24 |
| 2004/0177173 A1* | 9/2004 | Yang et al. ........................ | 710/8 |
| 2005/0160333 A1* | 7/2005 | Park .............................. | 714/718 |
| 2010/0049895 A1* | 2/2010 | Liang ............................ | 710/308 |
| 2010/0293312 A1* | 11/2010 | Sonnier et al. ................ | 710/107 |
| 2010/0312973 A1* | 12/2010 | Galbo et al. ................... | 711/154 |
| 2011/0125963 A1* | 5/2011 | Sun ............................... | 711/114 |
| 2012/0124280 A1* | 5/2012 | Oner ............................. | 711/105 |
| 2012/0151103 A1* | 6/2012 | Hu ................................ | 710/22 |
| 2013/0254431 A1* | 9/2013 | Kuroiwa et al. ............... | 710/14 |

FOREIGN PATENT DOCUMENTS

| | | |
|---|---|---|
| JP | 07-064606 | 3/1995 |
| JP | 2002-163147 | 6/2002 |
| KR | 10-2001-0061794 | 7/2001 |
| KR | 10-2006-0047046 | 5/2006 |

OTHER PUBLICATIONS

Office Action from Korean Intellectual Property Office dated Jan. 12, 2013.

* cited by examiner

*Primary Examiner* — Raymond Phan
(74) *Attorney, Agent, or Firm* — Muir Patent Law, PLLC

(57) ABSTRACT

A device includes a memory controller, a memory bus coupled to the memory controller, an internal memory and an external memory connection unit. The internal memory may be directly connected to the memory controller through the memory bus. The external memory connection unit may connect an external memory directly to the memory controller through a portion of signal lines in the memory bus, and may generate a flag signal indicating whether the external memory is connected to the external memory connection unit.

18 Claims, 9 Drawing Sheets

DEVICE INCLUDING AN EXTERNAL MEMORY CONNECTION UNIT CAPABLE OF ADOPTING AN EXTERNAL MEMORY

CROSS-REFERENCE TO RELATED APPLICATION

This application claims priority under 35 USC §119 to Korean Patent Application No. 10-2011-0090460, filed on Sep. 7, 2011, in the Korean Intellectual Property Office (KIPO), the contents of which are incorporated herein in its entirety by reference.

BACKGROUND

Example embodiments relate generally to a device including an internal memory as a main memory, and more particularly to a device capable of adopting an external memory to increase a capacity of the main memory.

Demand on multi-tasking is expected to increase gradually to process various tasks simultaneously in one device. Particularly with respect to the mobile devices, the performance for multi-tasking may be a main criterion in selecting a product.

In a personal computer, if one task starts, that task may be performed continuously until the user quits the task, and thus associated codes and data reside in a system memory or a main memory. When many tasks are performed simultaneously, a capacity of the main memory may be insufficient, which may lead to degradation of the performance. Particularly in mobile devices with a small memory size, over-usage of the main memory becomes a serious problem as the demand of multi-tasking is increased.

SUMMARY

Some example embodiments provide a device capable of increasing capacity of a main memory by adopting an external memory.

Some example embodiments provide a mobile device capable of increasing capacity of a main memory by adopting an external memory and maintaining point-to-point connection of data lines.

According to example embodiments, a device includes a memory controller, a memory bus coupled to the memory controller, an internal memory, and an external memory connection unit. The internal memory is directly connected to the memory controller through the memory bus. The external memory connection unit connects an external memory directly to the memory controller through a portion of signal lines in the memory bus, and generates a flag signal indicating whether the external memory is connected to the external memory connection unit.

The command-address bus of the memory bus may be shared by the external memory and the internal memory when the external memory is connected to the external memory connection unit.

The memory controller may increase a driving strength of drivers configured to drive the command-address bus when the external memory is connected to the external memory connection unit.

The internal memory may communicate with the memory controller with a maximum data bus width in a base mode representing that the external memory is not connected to the external memory connection unit. The maximum data bus width may be divided into a first data bus width and a second data bus width in a memory extension mode representing that the external memory is connected to the external memory connection unit such that the internal memory communicates with the memory controller with the first data bus width and the external memory communicates with the memory controller with the second data bus width.

The data bus of the memory bus may include dedicated data lines and variable data lines. The dedicated data lines may connect the internal memory to the memory controller in the base mode and the memory extension mode. The variable data lines may connect the internal memory to the memory controller in the base mode and connect the external memory to the memory controller in the memory extension mode.

Each of the variable data lines may include a path converter configured to operate by a mechanical force that is caused when the external memory is mounted in the external memory connection unit by a user. The path converter may include a first conductor, a second conductor and an insulator. The first conductor may form a conduction path between the internal memory and the memory controller in the base mode. The second conductor may form a conduction path between the external memory and the memory controller in the memory extension mode. The insulator may block an electrical connection between the internal memory and the memory controller in the memory extension mode.

Each of the variable data lines may include a switch configured to perform a switching operation in response to the flag signal such that the switch forms a conduction path between the internal memory and the memory controller in the base mode and the switch forms a conduction path between the external memory and the memory controller in the memory extension mode.

Each of the variable data lines may include a first line between the internal memory and the memory controller and a second line between the external memory and the memory controller. A first driver and a first reception buffer coupled to the first line may be enabled in the base mode and a second driver and a second reception buffer coupled to the second line may be enabled in the memory extension mode, in response to the flag signal.

The internal memory and the external memory may receive a common chip selection signal and the internal memory may perform an initializing operation corresponding to the base mode or the memory extension mode in response to the flag signal.

The internal memory and the external memory may receive respective chip selection signals different from each other and the internal memory may perform an initializing operation corresponding to the base mode or the memory extension mode in response to a command signal provided from the memory controller.

The device may further include a base substrate on an upper surface of which the memory controller and the internal memory are mounted. The external memory may be mounted on a bottom surface of the base substrate under the internal memory.

The external memory connection unit may include a flag pad and a resistor. A first voltage is applied to the flag pad, where the first voltage is provided from the external memory when the external memory is connected to the external memory connection unit. The resistor may be coupled between the flag pad and a second voltage, and the flag signal may be provided at a node between the resistor and the flag pad.

According to some example embodiments, a mobile device includes a system-on-chip, a memory bus, an internal memory and an external memory connection unit. The system-on-chip includes a memory controller and the memory bus is coupled to the memory controller. The internal memory is directly connected to the memory controller through the memory bus. The external memory connection unit connects an external memory directly to the memory controller through a portion of signal lines of the memory bus, and generates a flag signal indicating whether the external memory is connected to the external memory connection unit.

BRIEF DESCRIPTION OF THE DRAWINGS

The above and other aspects and features of the disclosure will become apparent by describing in detail exemplary embodiments thereof with reference to the attached drawings, in which.

DETAILED DESCRIPTION OF THE EMBODIMENTS

Figure 1:
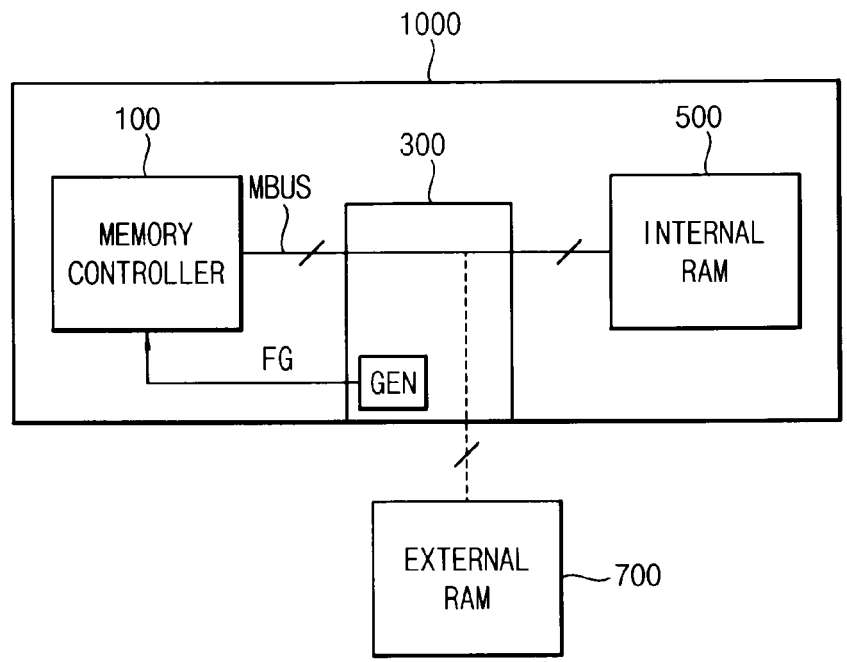
FIG. 1 is a block diagram illustrating a device adopting an external memory according to example embodiments.

Various example embodiments will now be described more fully hereinafter with reference to the accompanying drawings, in which exemplary embodiments are shown. The present invention may, however, be embodied in many different forms and should not be construed as limited to the example embodiments set forth herein. That is, these example embodiments are just that—examples—and many implementations and variations are possible that do not require the various details herein. It should also be emphasized that the disclosure provides details of alternative examples, but such listing of alternatives is not exhaustive. Furthermore, any consistency of detail between various examples should not be interpreted as requiring such detail—it is impracticable to list every possible variation for every feature described herein. The language of the claims should be referenced in determining the requirements of the invention. In the drawings, the sizes and relative size of layers and regions may be exaggerated for clarity. Like numerals refer to like elements throughout.

It will be also understood that although the terms first, second, third etc. may be used herein to describe various elements, components, regions, layers and/or sections, these elements, components, regions, layers, and/or sections should not be limited by these terms. Unless otherwise indicated, these terms are only used to distinguish one element, component, region, layer, or section from another element, components, region, layer, or section. Thus, a first element, components, region, layer, or section in some embodiments could be termed a second element, components, region, layer, or section in other embodiments, and, similarly, a second element, components, region, layer, or section could be termed a first element, components, region, layer, or section without departing from the teachings of the disclosure. Exemplary embodiments explained and illustrated herein may include their complementary counterparts. As used herein, the term "and/or" includes any and all combinations of one or more of the associated listed items and may be abbreviated as "/".

It will be understood that when an element or a layer is referred to as being "on," "connected to" or "coupled to" another element or layer, it may be directly on, connected to, or coupled to the other element or layer or intervening elements or layers may be present. In contrast, when an element is referred to as being "directly on," "directly connected to" or "directly coupled to" another element or layer, there are no intervening elements or layers present. Other words used to describe the relationship between elements or layers should be interpreted in a like fashion (e.g., "between" versus "directly between;" "adjacent" versus "directly adjacent," etc.).

The terminology used herein is for the purpose of describing particular example embodiments only and is not intended to be limiting of the present invention. As used herein, the singular forms "a," "an" and "the" should not exclude the plural forms as well, unless the context clearly indicates otherwise. It will be further understood that the terms "comprises" and/or "comprising," or "includes" and/or "including" when used in this specification, specify the presence of stated features, integers, steps, operations, elements, and/or components, but do not preclude the presence or addition of one or more other features, integers, steps, operations, elements, components, and/or groups thereof.

Locational terms, such as "beneath," "below," "lower," "above," "upper" and the like, may be used herein for ease of description to describe one element or feature's relationship to another element(s) or feature(s) as illustrated in the figures. It will be understood that the locational terms may be relative to a device and are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the locational descriptors used herein interpreted accordingly.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and/or the present disclosure, and will not be interpreted in an idealized or overly formal sense unless expressly so defined herein.

Hereinafter, example embodiments will be explained in detail with reference to the accompanying drawings.

FIG. 1 is a block diagram illustrating a device of adopting an external memory according to example embodiments.

Referring to FIG. 1, a device 1000 includes a memory controller 100, a memory bus MBUS coupled to the memory controller 100, an external memory connection unit 300 and an internal memory 500.

The memory controller 100 controls the internal memory 500 or an external memory 700 together with the internal memory 500 depending on operation modes of the device 1000. The internal memory 500 is directly connected to the memory controller 100 through the memory bus MBUS. For example, there may be no elements such as a serializer, deserializer, a buffer, a router, etc. on the memory bus MBUS, which increase read and/or write latencies significantly. The internal memory 500 may be directly connected to the memory controller 100 through signal lines in the memory bus MBUS. Data lines in the memory bus MBUS maintain point-to-point connection between the memory controller 100 and the internal memory 500 regardless of the operation modes.

The external memory connection unit 300 connects the external memory 700 directly to the memory controller 100 through a portion of signal lines in the memory bus MBUS. The external memory connection unit 300 may include a flag signal generator 350 that generates a flag signal FG indicating whether the external memory 700 is connected to the external memory connection unit 300.

The operation modes of the device 1000 may include a base mode and a memory extension mode. The flag signal FG may have a first logic level in the base mode representing that the external memory 700 is not connected to the external memory connection unit 300 and a second logic level in the memory extension mode representing that the external memory 700 is connected to the external memory connection unit 300. For example, the first logic level is a logic low level and the second logic level is a logic high level. The flag signal FG may be provided to the memory controller 100 and the memory controller 100 may perform set operations according to the operation modes in response to the flag signal FG. For example, the number of row addresses and/or column addresses may be increased in the memory extension mode compared with the base mode, and the memory controller 100 may change the address configuration depending on the base mode or the memory extension mode. Also, the flag signal FG may be provided to the internal memory 500 so that the internal memory 500 may perform set operations according to the operation modes in response to the flag signal FG.

The internal memory 500 and the external memory 700 may each be a random access memory (RAM) functioning as a system memory or a main memory of the device 1000. For example, the internal memory 500 and the external memory 700 may each be implemented with a dynamic random access memory (DRAM), a mobile DRAM, a static random access memory (SRAM), a phase change random access memory (PRAM), a resistance random access memory (RRAM), a nano floating gate memory (NFGM), a polymer random access memory (PoRAM), a magnetic random access memory (MRAM), a ferroelectric random access memory (FRAM), or the like.

The device 1000 according to example embodiments may increase capacity of the main memory with stable scalability and maintain the point-to-point connection of the memory controller 100 to both of the internal memory 500 and the external memory 700, thereby enhancing the performance of the device 1000.

Figure 2:
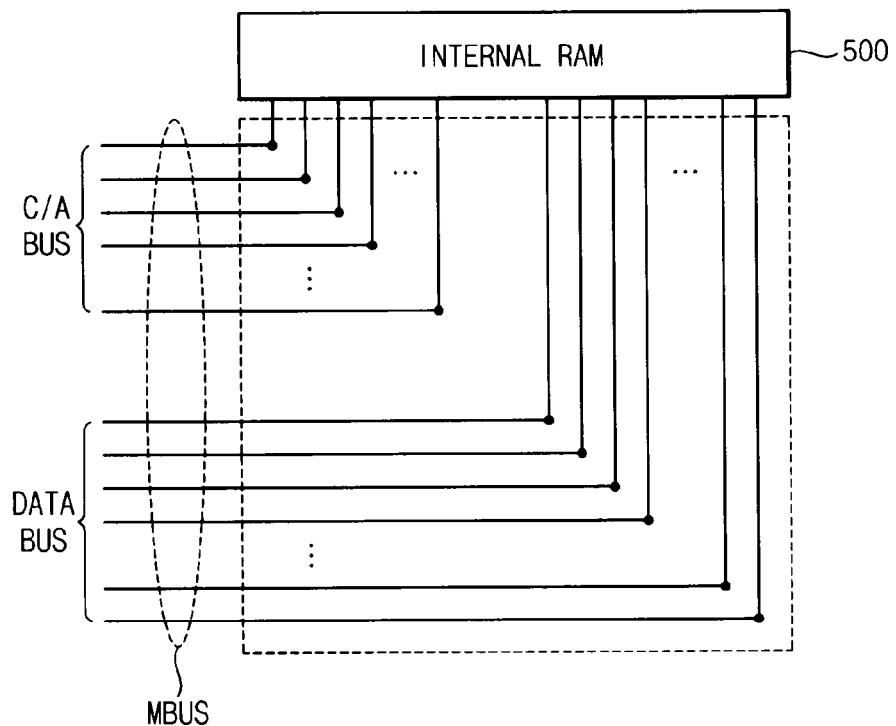
FIG. 2 is a diagram illustrating connections of a memory bus in a base mode according to an example embodiment.
Figure 3:
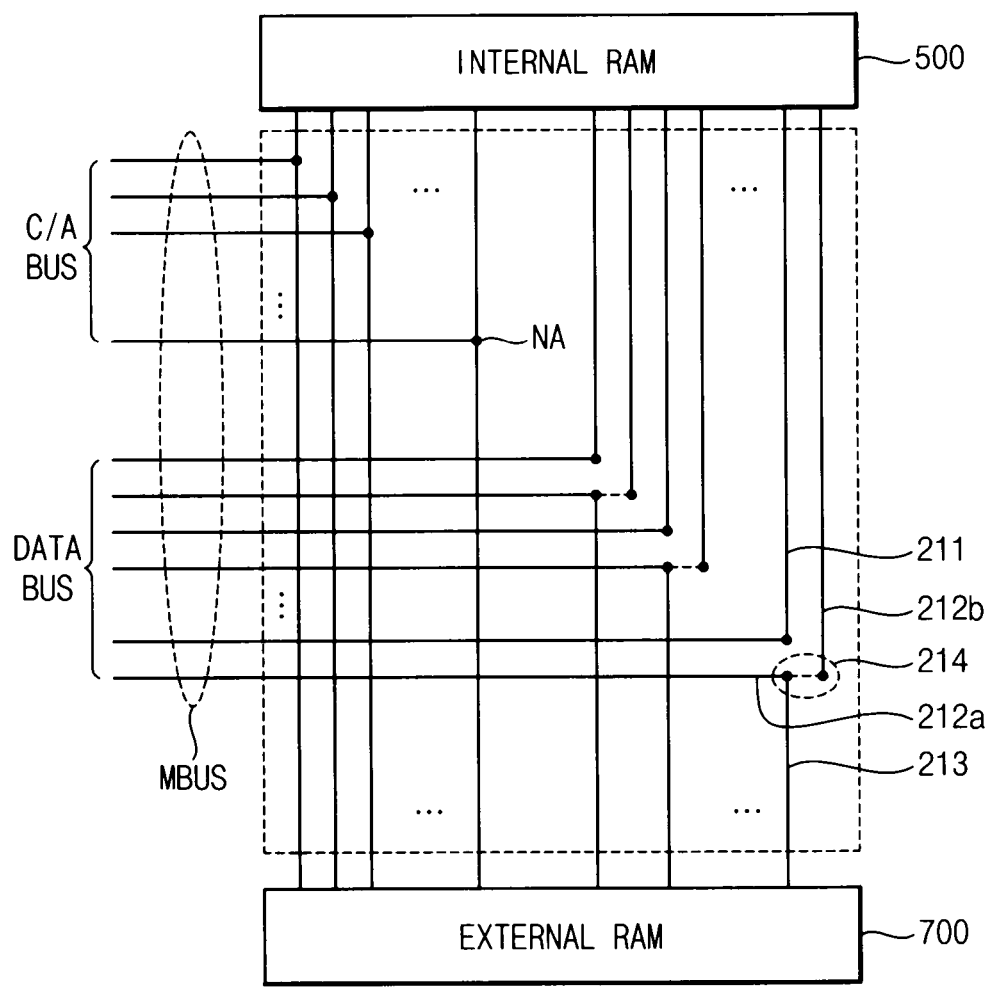
FIG. 3 is a diagram illustrating connections of a memory bus in a memory extension mode according to an example embodiment.

FIG. 2 is a diagram illustrating exemplary connections of a memory bus in a base mode, and FIG. 3 is a diagram illustrating exemplary connections of a memory bus in a memory extension mode. For convenience of illustration, the memory controller 100 coupled to one end of the memory bus MBUS is omitted in FIGS. 2 and 3.

Referring to FIG. 2, the memory bus MBUS includes a command-address (C/A) bus and a data bus. The command-address bus and the data bus include a plurality of signal lines, respectively. As illustrated in FIG. 2, all signal lines in the command-address bus and the data bus may maintain point-to-point connection between the memory controller 100 and the internal memory 500 in the base mode when the external memory 700 is not connected.

Referring to FIG. 3, in the memory extension mode when the external memory 700 is mounted in the external memory connection unit 300, the external memory 700 is directly connected to the memory controller 100 through a portion of signal lines in the memory bus MBUS. For example, the portion of the signal lines correspond to the signal lines in the command-address bus and some signal lines 212 in the data bus, as illustrated in FIG. 3.

When the external memory 700 is mounted on or connected to the device 1000, the command-address bus of the memory bus MBUS may be shared by the external memory 700 and the internal memory 500. For example, each signal line in the command-address bus may be additionally connected to the external memory 700 at respective nodes NA while keeping the electrical connection between the internal memory 500 and the memory controller 100. The node NA may represent pads and bumps to connect the device 1000 and the external memory 700.

The data bus may include dedicated data lines 211 and variable data lines 212a. The dedicated data lines 211 connect the internal memory 500 to the memory controller 100 regardless of the operation modes, (e.g., both in the base mode and in the memory extension mode). The variable data lines 212a connect the internal memory 500 to the memory controller 100 in the base mode and connect the external memory 700 to the memory controller 100 in the memory extension mode.

In the memory extension mode, the variable data line 212a may be disconnected from a branch line 212b coupled to the internal memory 500 and the variable data line 212a may be connected to a branch line 213 coupled to the external memory 700. For example, the disconnection portion 214 in FIG. 3 may be implemented using an insulator 258 illustrated in FIG. 7 or using a switch SW illustrated in FIG. 9. With forming a disconnection portion 148 when the external memory 700 is mounted, the point-to-point connection between the internal memory 500 and the memory controller 100 in the base mode may be converted to the point-to-point connection between the external memory 700 and the memory controller 100 in the memory extension mode.

As a result, the internal memory 500 may communicate with the memory controller 100 with a maximum data bus width in the base mode and with a reduced data bus width in the memory extension mode. The maximum data bus width may be divided into a first data bus width and a second data bus width in the memory extension mode such that the internal memory communicates with the memory controller with the first data bus width and the external memory communicates with the memory controller with the second data bus width.

The first data bus width may correspond to the number of the dedicated data lines 211, the second data bus width may correspond to the number of the variable data lines 212a, b, and the maximum data bus width may correspond to the sum of the numbers of the dedicated data lines 211 and the variable data lines 212a, b. In some example embodiments, the number of the dedicated data lines 211 may be equal to the number of the variable data lines 212a, b so that the internal memory 500 and the external memory 700 may communicate with the memory controller 100 with the same data bus width.

Figure 4:
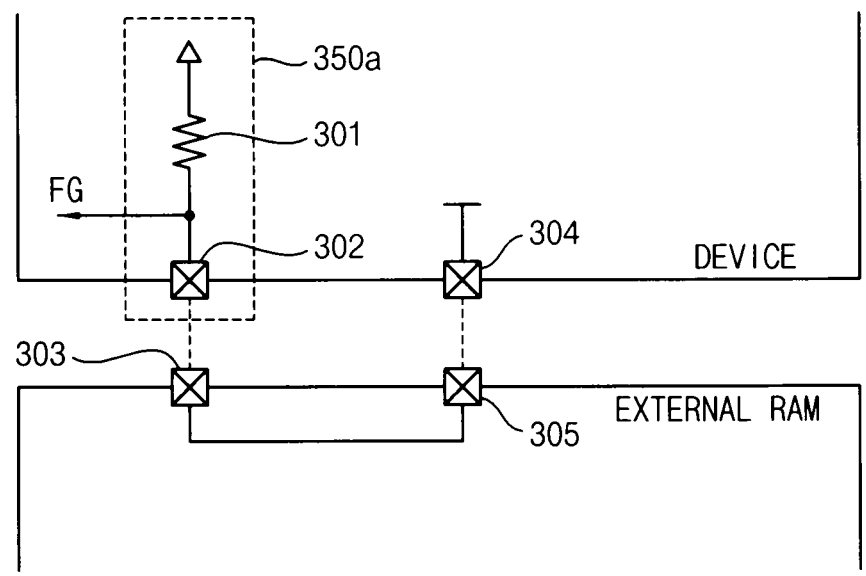
FIG. 4 is a diagram illustrating an example of a flag signal generator in the device of FIG. 1.

FIG. 4 is a diagram illustrating an example of a flag signal generator in the device of FIG. 1.

Referring to FIG. 4, a flag signal generator 350a in the external memory connection unit 300 may include a flag pad 302 and a resistor 301. Other pads for connecting the external memory 700 to the memory bus MBUS are omitted in FIG. 4. A first voltage V1 is applied to the flag pad 302 and the first voltage V1 may be provided from the external memory 700 when the external memory 700 is connected to the device 1000. The resistor 301 is coupled between the flag pad 302 and a second voltage V2. The flag signal FG may be provided at a node between the resistor 301 and the flag pad 302.

When the external memory 700 is mounted on the device 1000, the external memory 700 may receive the first voltage V1 through a pad 304 of the device 1000 and a pad 305 of the external memory 700. The external memory 700 may be powered internally using a battery included in the external memory 700 or may be powered externally from the device 1000. For example, the two pads 304 and 305 may be connected via an electrical bump and the first voltage V1 may be provided to the external memory 700 to supply a power to the external memory 700. Also the two pads 302 and 303 may be connected via an electrical bump. The two pads 303 and 305 of the external memory 700 may be connected internally as illustrated in FIG. 4 and thus the first voltage V1 may be applied to the flag bump 302.

For example, the first voltage V1 may be a power supply voltage and the second voltage V2 may be a ground voltage. In this case, the flag pad 302 is pulled down to the ground voltage V2 and the flag signal FG may have the logic low level in the base mode since the flag pad 301 is floated and disconnected from the power supply voltage V1. In the memory extension mode when the external memory 700 is mounted on the device 1000, the flag pad 302 is pulled up to the power supply voltage V1 and the flag signal FG may have the logic high level.

The logic level of the flag signal FG may represent the operation modes, (e.g., whether the external memory 700 is mounted on the device 1000 or not). The flag signal generator 350a may be implemented with various configurations identical to or similar to that of FIG. 4.

Figure 5:
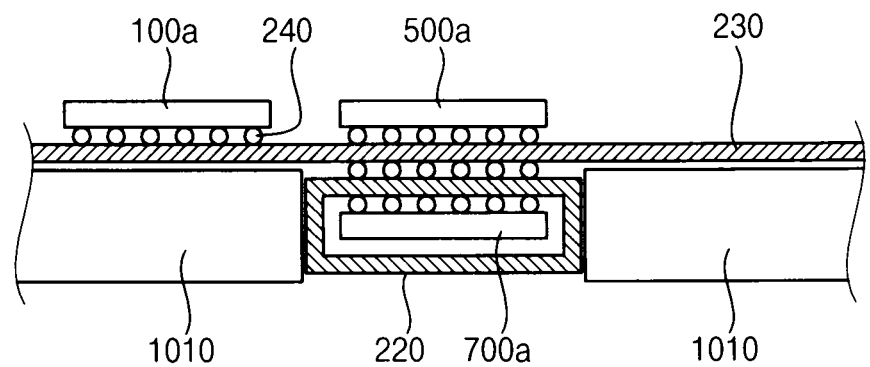
FIG. 5 is a diagram illustrating a device according to an example embodiment.

FIG. 5 is a diagram illustrating a device according to an example embodiment.

Referring to FIG. 5, a device 1000a may be formed using a base substrate 230 on an upper surface of which a memory controller 100a and an internal memory 500a are mounted. The base substrate 230 may be a printed circuit board (PCB) and a memory bus MBUS may be formed in and/or on the base substrate 230.

The memory controller 100a may be a single chip configured to perform memory control function alone. In other embodiments, the memory controller 100a may be included in a system-on-chip (SoC) in which other processors are integrated together as will be described with reference to FIG. 13. The memory controller 100a, the internal memory 500a and the external memory 700a may be packaged separately or together and may be electrically connected to the base substrate 230 and a socket 220 through electrical bumps 240, wire bonding (not shown) and signal lines in and/or on the base substrate 230.

The device 1000a may be surrounded by a case 1010. Only the bottom portion of the case 1010 is illustrated in FIG. 5. In some example embodiments, the socket 220 may be disposed in the case 1010 such that the external memory 700a may be mounted on a bottom surface of the base substrate 230 under the internal memory 500a. The socket 220 in which the external memory 700a is inserted and mounted may be formed in the case 1010 as a built-in element of the case 1010 or may be detachable from the case 1010.

In some embodiments, the external memory 700a may be connected to the device 1000a at the location near the internal memory 500a to increase the capacity of the main memory such that the memory controller 100a may maintain the point-to-point connections to the internal memory 500a and the external memory 700a, thereby enhancing the performance of the device 1000a.

FIGS. 6A, 6B, 7A, and 7B are diagrams illustrating connections of the memory bus according to an example embodiment.

Figure 6A:
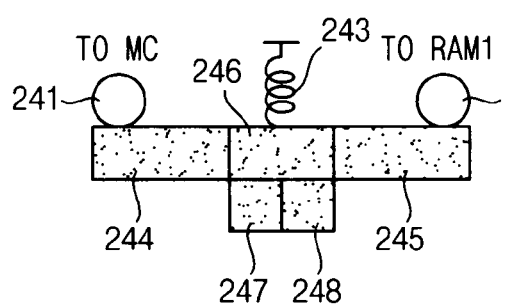
FIGS. 6A, 6B, 7A, and 7B are diagrams illustrating connections of the memory bus according to an example embodiment.
Figure 6B:
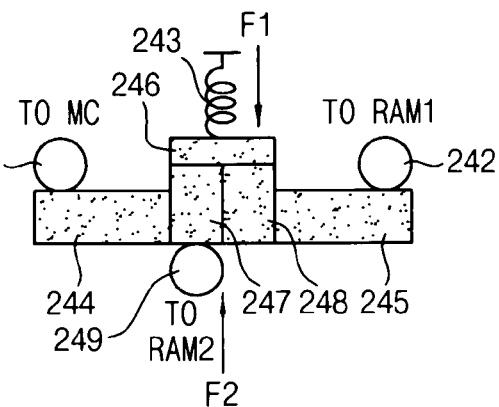
Figure 7A:
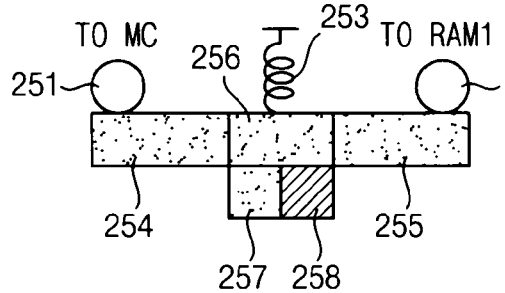
Figure 7B:
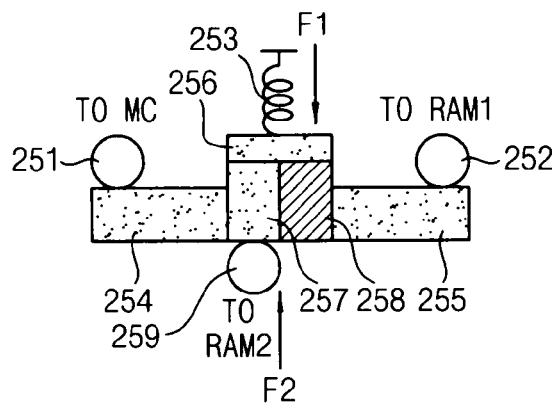

FIGS. 6A and 6B illustrates an example connection of a signal line in the command-address bus that is shared by the internal memory and the external memory in the memory extension mode, and FIGS. 7A and 7B illustrates an example connection of the above-mentioned variable data line.

In FIG. 6A, the diagram shows an exemplary connection of the command-address line in the base mode. In FIG. 6B, the diagram shows an exemplary connection of the command-address line in the memory extension mode. In FIGS. 6A and 6B, the command-address line may include a path converter configured to operate by a mechanical force F2 that is caused when the external memory is mounted in the external memory connection unit by a user. As illustrated in FIGS. 6A and 6B, the path converter may include a first conductor 246, a second conductor 247 and a third conductor 248, which may move up and down by the mechanical forces F1 and F2.

The left portion 244 of the command-address line may be connected to the memory controller MC through a bump 241 and the right portion 245 of the command-address line may be connected to the internal memory RAM1 through a bump 242. In the memory extension mode, the second conductor 247 may be connected to the external memory RAM2 through a bump 249.

The first conductor 246 may be inserted between the portions 244 and 245 of the command-address line in the base mode to form a conduction path between the memory controller MC and the internal memory RAM1. In the memory extension mode, the path converter may move up due to the mechanical force F2 and the second conductor 247 and the third conductor 248 may be inserted between the portions 244 and 245 of the command-address line. Thus the command-address line may connect the memory controller MC to both of the internal memory RAM1 and the external memory RAM2 in the memory extension mode. If the mounted external memory RAM2 is removed from the socket 220, the mechanical force F2 disappears and the path converter may be restored to the connection of the base mode due to the force F1 caused by an elastic element 243. The command-address bus may be shared by the external memory and the internal memory in the memory extension mode.

In FIG. 7A, the diagram shows an exemplary connection of the variable data line in the base mode. In FIG. 7B, the diagram shows an exemplary connection of the variable data line in the memory extension mode. In FIGS. 7A and 7B, a variable data line may include a path converter configured to operate by a mechanical force F2 that is caused when the external memory is mounted in the external memory connection unit by a user. As illustrated in FIGS. 7A and 7B, the path converter may include a first conductor 256, a second conductor 257 and an insulator 258, which may move up and down by the mechanical forces F1 and F2.

The left portion 254 of the variable data line may be connected to the memory controller MC through a bump 251 and the right portion 255 of the variable data line may be connected to the internal memory RAM1 through a bump 252. In the memory extension mode, the second conductor 257 may be connected to the external memory RAM2 through a bump 259.

The first conductor 256 may be inserted between the portions 254 and 255 of the variable data line in the base mode to form a conduction path between the memory controller MC and the internal memory RAM1. In the memory extension mode, the path converter may move up due to the mechanical force F2 and the second conductor 257 and the insulator 258 may be inserted between the portions 254 and 255 of the variable data line. Thus the variable data line may disconnect the memory controller MC from the internal memory RAM1 and connect the memory controller MC to the external memory RAM2 in the memory extension mode. If the mounted external memory RAM2 is removed from the socket 220, the mechanical force F2 disappears and the path converter may be restored to the connection of the base mode due to the force F1 caused by an elastic element 253. The electrical path of the variable data line between the memory controller and the internal memory in the base mode may be converted to the electrical path between the memory controller and the external memory in the memory extension mode and vice versa.

Figure 8:
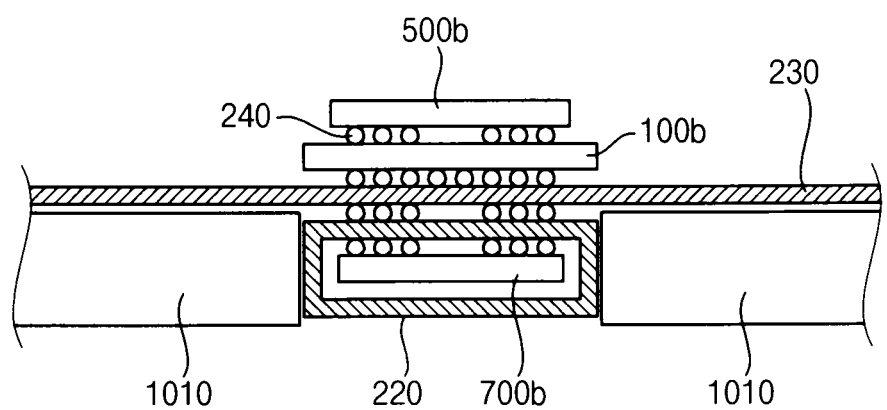
FIG. 8 is a diagram illustrating a device according to another example embodiment.

FIG. 8 is a diagram illustrating a device according to another example embodiment.

Referring to FIG. 8, a device 1000b may be formed using a base substrate 230 on an upper surface of which a memory controller 100b and an internal memory 500b are sequentially stacked. The base substrate 230 may be a printed circuit board (PCB) and a memory bus MBUS may be formed in and/or on the base substrate 230.

The memory controller 100b may be a single chip configured to perform memory control function alone. The memory controller 100b may be included in a system-on-chip (SoC) in which other processors are integrated together, as will be described with reference to FIG. 13. The memory controller 100b, the internal memory 500b, and the external memory 700b may be packaged separately or together and may be electrically connected to the base substrate 230 and a socket 220 through electrical bumps 240, wire bonding (not shown), and signal lines in and/or on the base substrate 230. The memory controller 100b and the base substrate 230 may include through-silicon vias (TSVs) that connect the upper bumps and the bottom bumps.

The device 1000b may be surrounded by a case 1010. Only the bottom portion of the case 1010 is illustrated in FIG. 8. In some example embodiments, the socket 220 may be disposed in the case 1010 such that the external memory 700b may be mounted on a bottom surface of the base substrate 230 under the internal memory 500b. The socket 220 in which the external memory 700a is inserted and mounted may be formed in the case 1010 as a built-in element of the case 1010 or may be detachable from the case 1010.

The external memory 700b may be connected to the device 1000b at a location near the internal memory 500b to increase the capacity of the main memory such that the memory controller 100b may maintain the point-to-point connections to the internal memory 500b and the external memory 700b, thereby enhancing the performance of the device 1000b.

At least some elements illustrated in FIGS. 5 and 8 may be packaged in various forms, including, but not limited to, as package on package (PoP), ball grid arrays (BGAs), chip scale packages (CSPs), plastic leaded chip carrier (PLCC), plastic dual in-line package (PDIP), die in waffle pack, die in wafer form, chip on board (COB), ceramic dual in-line package (CERDIP), plastic metric quad flat pack (MQFP), thin quad flat pack (TQFP), small outline IC (SOIC), shrink small outline package (SSOP), thin small outline package (TSOP), system in package (SIP), multi chip package (MCP), wafer-level fabricated package (WFP), or wafer-level processed stack package (WSP).

Figure 9:
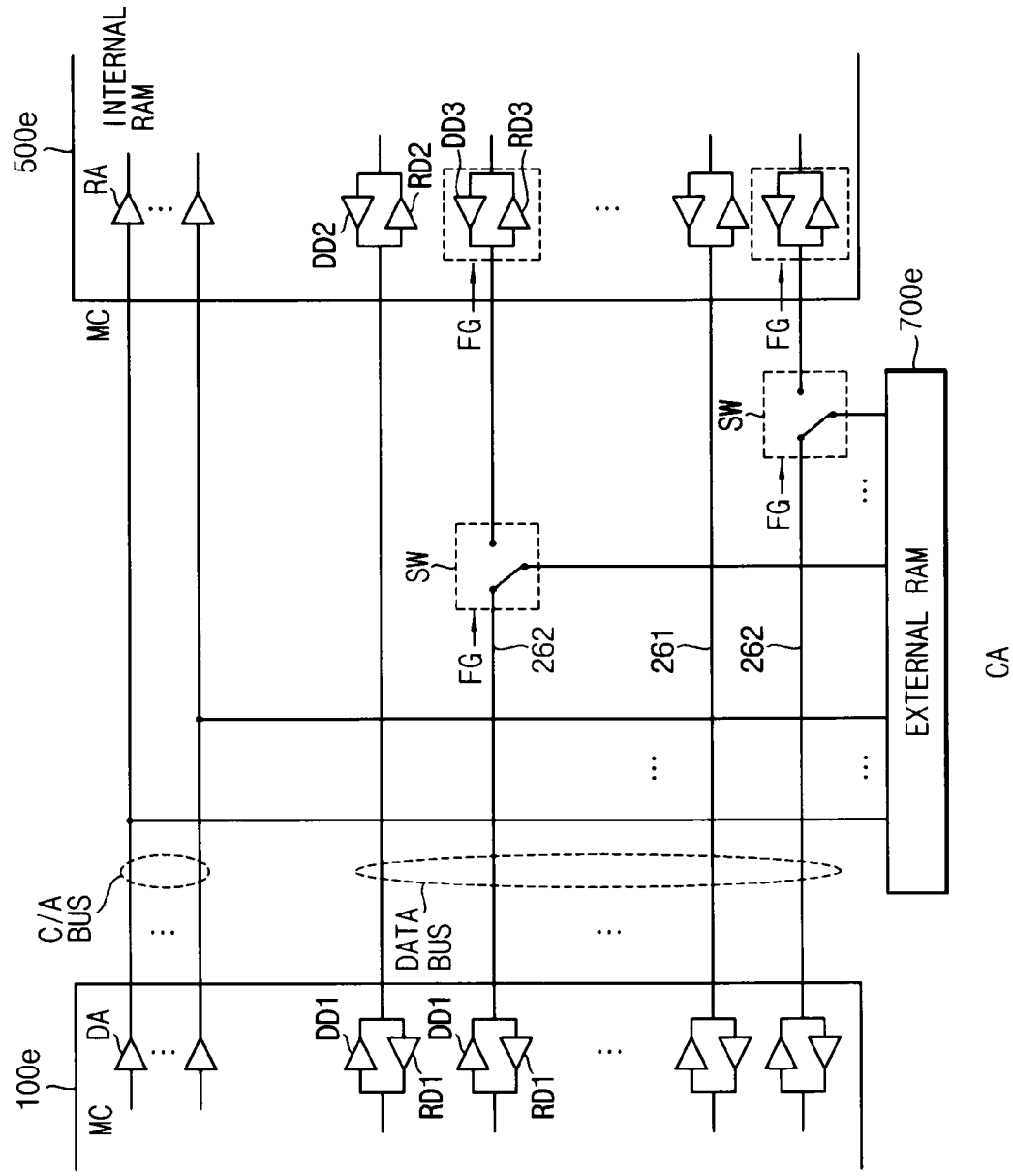
FIGS. 9 and 10 are diagrams illustrating connections of the memory bus according to other example embodiments.
Figure 10:
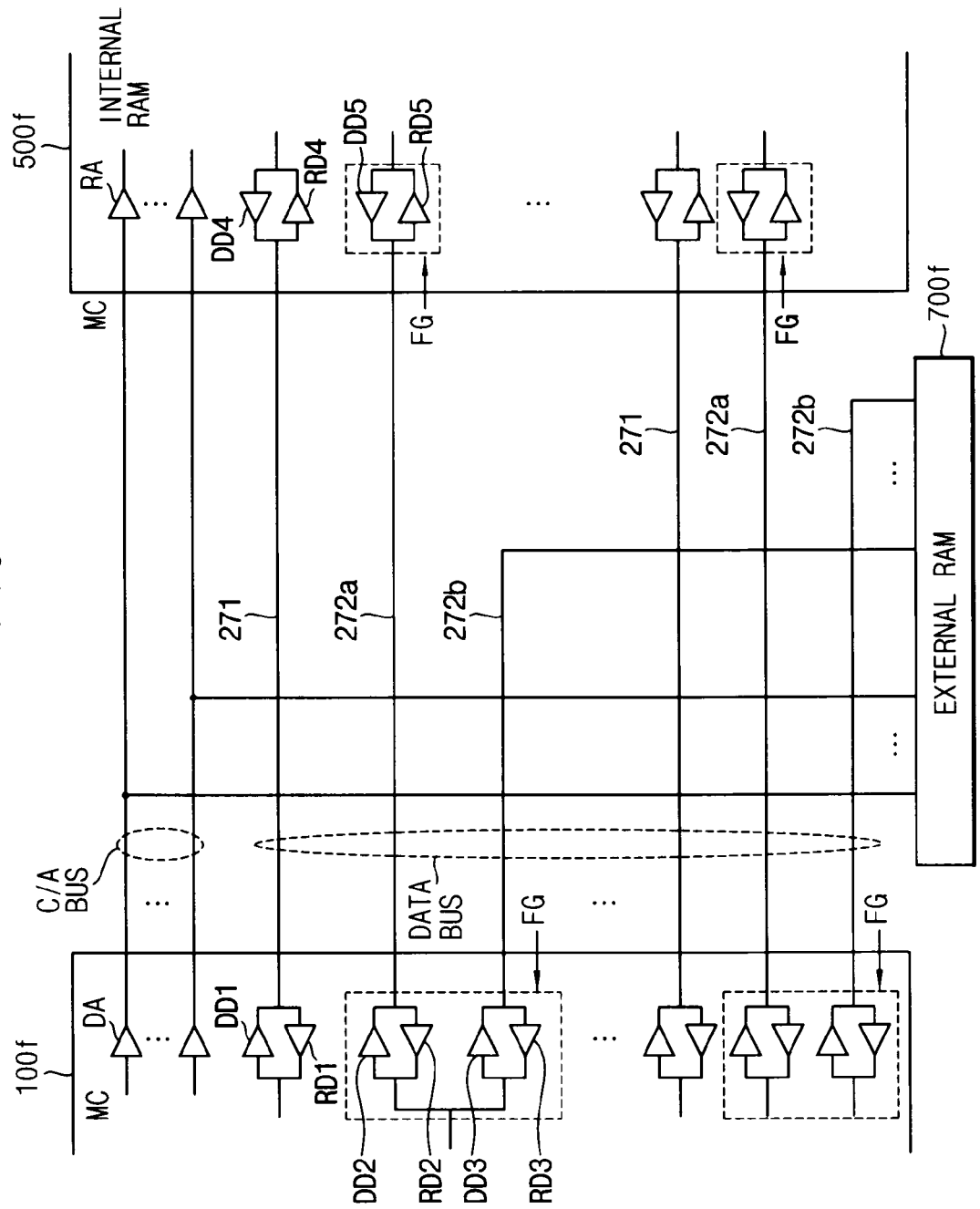

FIGS. 9 and 10 are diagrams illustrating connections of the memory bus according to other example embodiments.

FIG. 9 illustrates an example connection of the memory bus in the memory extension mode. As mentioned above, the command-address (C/A) bus of the memory bus may be shared by the internal memory 500e and the external memory 700e when the external memory 700e is mounted. For example, the command-address bus connects the memory controller 100e and the internal memory 500e in the base mode and the external memory 700e may be additionally connected to the command-address bus in the memory extension mode.

As described with reference to FIGS. 2 and 3, the data bus may include dedicated data lines (e.g. dedicated data lines 261) and variable data lines (e.g. variable data lines 262). The dedicated data lines 261 connect the internal memory 500e to the memory controller 100e regardless of the operation modes, (e.g., both in the base mode and in the memory extension mode). The variable data lines 262 connect the internal memory 500e to the memory controller 100e in the base mode and connect the external memory 700e to the memory controller 100e in the memory extension mode.

Each of the variable data lines may include a switch SW configured to perform a switching operation in response to the flag signal FG such that the switch SW forms a conduction path between the internal memory 500e and the memory controller 100e in the base mode and the switch SW forms a conduction path between the external memory 700e and the memory controller 100e in the memory extension mode.

As illustrated in FIG. 9, the command-address bus may be a uni-directional bus and the data bus may be a bi-directional bus.

Each command-address line in the command-address bus may be coupled to a driver DA in the memory controller 100e and a reception buffer RA in the internal memory 500e. The parasitic capacitance of the command-address bus may be increased when the external memory 700e is additionally coupled to the command-address bus. To compensate the increase of the parasitic capacitance of the command-address bus, the memory controller 100e may increase a driving strength of drivers DA configured to drive the command-address bus in response to the flag signal FG when the external memory is connected to the external memory connection unit.

Each data line in the data bus may be coupled to a driver DD1 and a reception buffer RD1 in the memory controller 100e and a driver DD2 or DD3 and a reception buffer RD2 or RD3 in the internal memory 500e. In the memory extension mode, the variable data line 262 may be disconnected from the internal memory 500e by the switch SW. In this case, the driver DD3 and the reception buffer RD3 corresponding to the variable data line 262 may be disabled in response to the flag signal FG.

FIG. 10 illustrates an example connection of the memory bus in the memory extension mode. As mentioned above, the command-address (C/A) bus of the memory bus may be shared by the internal memory 500f and the external memory 700f when the external memory 700f is mounted. For example, the command-address bus connects the memory controller 100f and the internal memory 500f in the base mode and the external memory 700f may be additionally connected to the command-address bus in the memory extension mode.

As described above, the data bus may include dedicated data lines (e.g. dedicated data lines 271) and variable data lines (e.g. variable data lines 272a and 272b). The dedicated data lines 271 connect the internal memory 500f to the memory controller 100f regardless of the operation modes (e.g., both in the base mode and in the memory extension mode). The variable data lines 272a and 272b connect the internal memory 500f to the memory controller 100f in the base mode and connect the external memory 700f to the memory controller 100f in the memory extension mode.

In the embodiment of FIG. 9, the conduction paths between the memory controller 100e and the memories 500e and 700e are controlled using the switches SW. In the embodiment of FIG. 10, each variable data line may be implemented with a pair of lines 272a and 272b to control the conduction paths depending on the operation modes.

As illustrated in FIG. 10, each of the variable data lines may includes a first line 272a between the internal memory 500f and the memory controller 100f and a second line 272b between the external memory 700f and the memory controller 100f. The first line 272a or the second line 272b may be selectively enabled in response to the flag signal FG. For example, in response to the deactivated flag signal FG, a first driver DD2 and a first reception buffer RD2 coupled to the first line 272a may be enabled and a second driver DD3 and a second reception buffer RD3 coupled to the second line 272b may be disabled in the base mode. In another example, in response to the activated flag signal FG, the first driver DD2 and the first reception buffer RD2 coupled to the first line 272a may be disabled and the second driver DD3 and the second reception buffer RD3 coupled to the second line 272b may be enabled in the memory extension mode.

The conduction path through the first line 272a between the memory controller 100f and the internal memory 500f and the conduction path through the second line 272b between the memory controller 100f and the external memory 700f may be selectively enabled depending on the operation modes. In the memory extension mode, the driver DD5 and the reception buffer RD5 coupled to the first line 272a in the internal memory 500f may be further disabled to reduce power consumption.

Figure 11A:
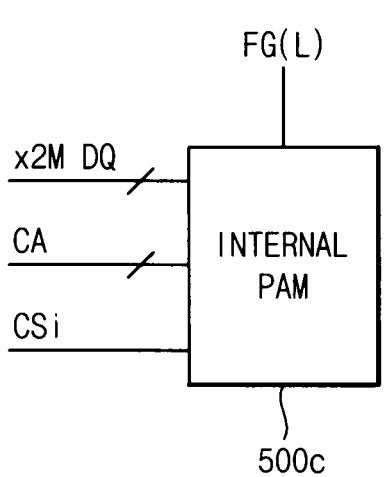
FIGS. 11A and 11B are diagrams for describing operations of the internal memory and the external memory according to an example embodiment.
Figure 11B:
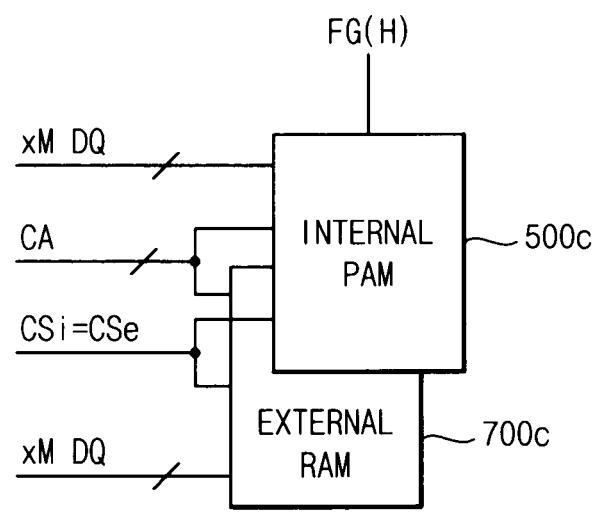

FIGS. 11A and 11B are diagrams for describing operations of the internal memory and the external memory according to an example embodiment.

In FIG. 11A, the diagram shows the internal memory 500c in the base mode. In FIG. 11B, the diagram shows the internal memory 500c and the external memory 700c in the memory extension mode. For example, the logic low level L of the flag signal FG may indicate the base mode and the logic high level H of the flag signal FG may indicate the memory extension mode.

In the base mode, the internal memory 500c may communicate with the memory controller with the data bus width of, for example, 2M, and may receive a command-address signal CA and a chip selection signal CSi from the memory controller. In the memory extension mode, the internal memory 500c and the external memory 700c may receive the common chip selection signal CSi=CSe from the memory controller and may communicate with the memory controller with the data bus width of M, respectively, where M is a data bus width. As described above, the external memory 700c and the internal memory 500c may receive the common command-address signal CA since the command-address bus is shared by the external memory 700c and the internal memory 500c.

The internal memory 500c may perform an initializing operation corresponding to the base mode or the memory extension mode in response to the flag signal FG. In this case, the conditions corresponding to the respective operation modes may be stored in the internal memory as default values. In other example embodiments, the internal memory 500c and the external memory 700c may be initialized based on the chip selection signal CSi (or CSi=CSe) and the command-address signal CA.

Figure 12A:
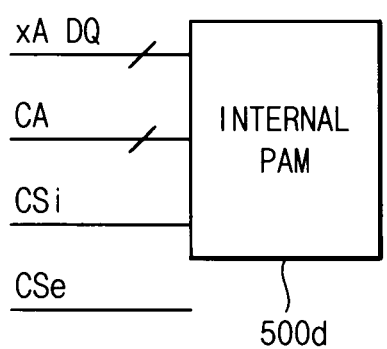
FIGS. 12A and 12B are diagrams for describing operations of the internal memory and the external memory according to another example embodiment.
Figure 12B:
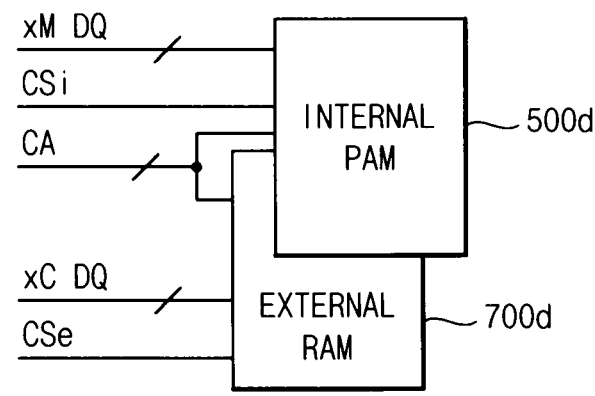

FIGS. 12A and 12B are diagrams for describing operations of the internal memory and the external memory according to another example embodiment.

In FIG. 12A, the diagram shows an exemplary internal memory 500d in the base mode. In FIG. 12B, the diagram shows an exemplary internal memory 500d and external memory 700d in the memory extension mode.

In the base mode, the internal memory 500d may communicate with the memory controller with a data bus width of A and may receive a command-address signal CA and a chip selection signal CSi from the memory controller. In the memory extension mode, the internal memory 500c and the external memory 700c may receive different chip selection signal CSi and CSe, respectively, from the memory controller and may communicate with the memory controller with data bus widths of B and C, respectively. The internal memory 500d may communicate with the memory controller with the maximum data bus width A in the base mode. The maximum data bus width A may be divided into the first data bus width B and the second data bus width C in the memory extension mode, which are assigned to the internal memory 500d and the external memory 700d, respectively. As a result, the internal memory 500d may communicate with the memory controller with the first data bus width B and the external memory 700d may communicate with the memory controller with the second data bus width C in the memory extension mode. As described above, the external memory 700d and the internal memory 500d may receive the common command-address signal CA since the command-address bus is shared by the external memory 700d and the internal memory 500d. The internal memory 500d may perform an initializing operation corresponding to the base mode or the memory extension mode based on the command-address signal CA from the memory controller.

In the memory extension mode, the internal memory 500d and the external memory 700d may be initialized by the respective operational conditions. For example, the internal memory 500d may be initialized based on the command-address signal CA representing the operational condition of the internal memory 500d in the memory extension mode by activating the chip selection signal CSi to the internal memory 500d and deactivating the chip selection signal CSe to the external memory 700d. Similarly, the external memory 700d may be initialized based on the command-address signal CA representing the operational condition of the external memory 700d in the memory extension mode by activating the chip selection signal CSe to the external memory 700d and deactivating the chip selection signal CSi to the internal memory 500d.

The external memory 700d and the internal memory 500d may be initialized to the different operational conditions in the memory extension mode. For example, the operational conditions may include a burst length, a burst type, a wrap control, a latency, etc.

Figure 13:
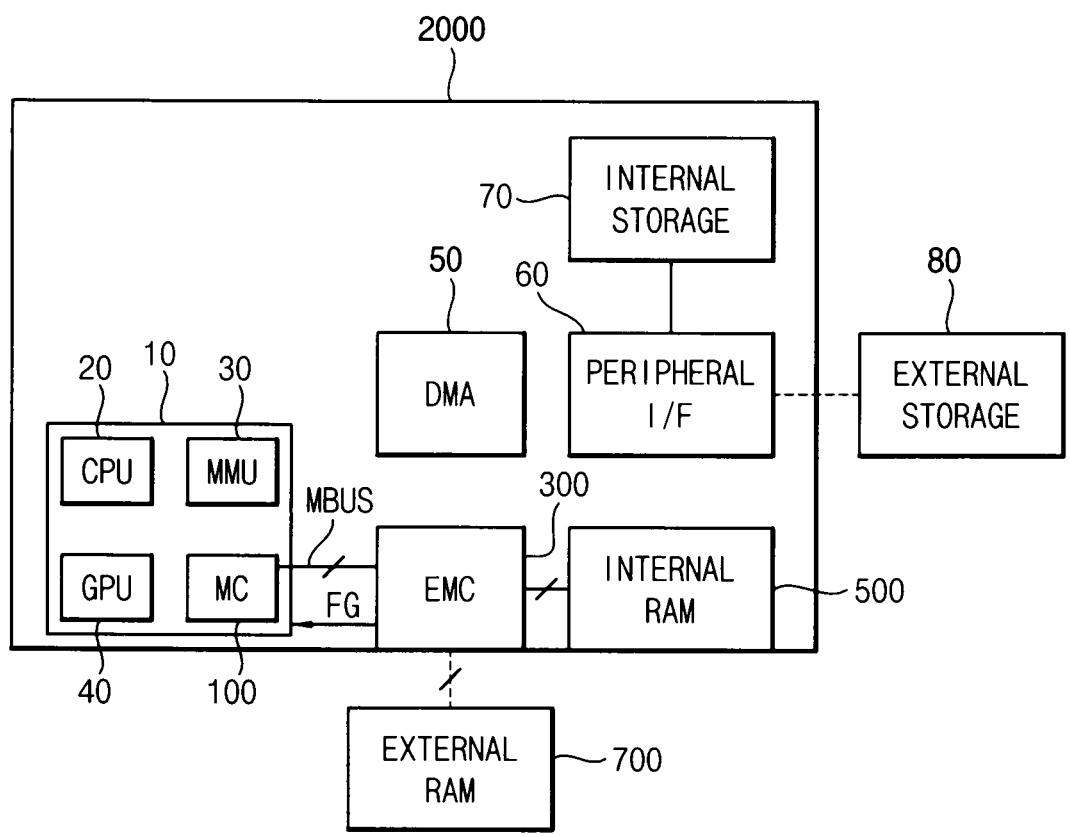
FIG. 13 is a block diagram illustrating a mobile device according to example embodiments.

FIG. 13 is a block diagram illustrating a mobile device according to example embodiments.

Referring to FIG. 13, a mobile device 2000 may include a system-on-chip 10 including a memory controller 100, a memory bus MBUS coupled to the memory controller 100, an external memory connection unit (EMC) 300 and an internal memory 500.

The system-on-chip 10 may be a single chip in which a system having various functions is integrated. For example, the system-on-chip 10 may include a central processing unit (CPU) 20, a memory management unit (MMU) 30, a graphic processing unit (GPU) 40, the memory controller (MC) 100, etc.

The mobile device 2000 may further include a direct memory access controller (DMAC) 50, a peripheral interface 60, an internal storage 70, etc. The peripheral interface 60 may be coupled to the internal storage 70 and an external storage 80. The DMAC 50 may control the data transfer between the internal memory 500 and the storages 70 and 80 independently of the memory controller 100.

As described with reference to FIG. 1, the memory controller 100 may control the internal memory 500 or an external memory together with the internal memory 500 depending on operation modes of the device 2000. The internal memory 500 is directly connected to the memory controller 100 through the memory bus MBUS.

For example, the memory controller 100 may be directly connected to the internal memory 500 through the memory bus MBUS with no other elements such as a serializer, deserializer, a buffer, a router, etc. on the memory bus MBUS, which increase read and/or write latencies significantly. The internal memory 500 is directly connected to the memory controller 100 through signal lines in the memory bus MBUS. Data lines in the memory bus MBUS may maintain point-to-point connection between the memory controller 100 and the internal memory 500 regardless of the operation modes.

The external memory connection unit 300 connects the external memory 700 directly to the memory controller 100 through a portion of signal lines in the memory bus MBUS. The external memory connection unit 300 may include input-output pads, bumps, branch signal lines, a flag signal generator, the path converters of FIGS. 6 and 7 and/or the switches of FIG. 9.

The external memory connection unit 300 may not include a serializer, a deserializer, a buffer, a router, etc., to maintain point-to-point connection between the external memory 700 and the memory controller 100.

The external memory connection unit 300 may include the flag signal generator that generates a flag signal FG indicating whether the external memory 700 is connected to the external memory connection unit 300. The flag signal FG may have a first logic level in the base mode representing that the external memory 700 is not connected to the external memory connection unit 300 and a second logic level in the memory extension mode representing that the external memory 700 is connected to the external memory connection unit 300. For example, the first logic level is a logic low level and the second logic level is a logic high level.

The memory controller 100 may perform set operations according to the operation modes in response to the flag signal FG. For example, the number of row addresses and/or column addresses may be increased in the memory extension mode compared with the base mode, and thus the memory controller 100 may change the address configuration depending on the base mode or the memory extension mode. Also, the flag signal FG may be provided to the internal memory 500 so that the internal memory 500 may perform set operations according to the operation modes in response to the flag signal FG.

The internal memory 500 and the external memory 700 may each be a random access memory (RAM) functioning as a system memory or a main memory of the device 2000. For example, the internal memory 500 and the external memory 700 may each be implemented with a dynamic random access memory (DRAM), a mobile DRAM, a static random access memory (SRAM), a phase change random access memory (PRAM), a resistance random access memory (RRAM), a nano floating gate memory (NFGM), a polymer random access memory (PoRAM), a magnetic random access memory (MRAM), a ferroelectric random access memory (FRAM), or the like. The storages 70 and 80 may be a solid state drive, a hard disk drive, etc.

The mobile device 2000 may be an arbitrary device including the internal memory 300 functioning as a system memory or a main memory. For example, the mobile device 2000 may be a digital camera, a mobile phone, a personal digital assistant (PDA), a portable multimedia player (PMP), a smart phone, etc.

To enhance the performance of mobile devices, research and development will be expedited toward a hardware platform based on a system-on-chip including a homogeneous or heterogeneous multi-core processor and a software platform using the hardware platform. Accordingly, demand for multi-tasking is expected to increase gradually, with increased demand to process various tasks simultaneously in one device. Particularly with respect to the mobile devices, the performance for multi-tasking may be a main criterion in selecting a product.

In a personal computer, if one task starts, the task is performed continuously until the user quits the task, and associated codes and data may have to reside in a system memory or a main memory for that entire time. In some embodiments, the main memory may be implemented with the DRAM. As new tasks are added, the internal memory is filled up gradually. When the capacity of the internal memory becomes short, a swapping may be performed such that a portion of the storage is assigned and used as the main memory. In this case, the speed of performing the task is reduced compared with a case in which only the physical memory is used as the main memory.

In case of mobile devices, memory resources are further limited and the system manages the tasks. In some embodiments, a swapping method may not be available in the mobile devices since the system response speed is very important in the mobile devices. Accordingly, when a remaining capacity of the main memory is insufficient, the newly added task may be denied or the previous task may be finished compulsorily. It may be difficult to realize stable multi-tasking in mobile devices.

To support stable multi-tasking, the devices 1000 and 2000 according to example embodiments may provide the configuration and the method capable of increasing capacity of the main memory using the external memory with stable scalability. In the conventional personal computer, the main memory may be added in the form of a memory module or a RAM card of IC type through the peripheral interface 60. In this case, the read/write latency is significantly increased due to data conversion, data routing, etc.

The devices 1000 and 2000 according to example embodiments may efficiently adopt an external memory as the main memory and maintain point-to-point connection between the memory controller and the internal/external memory. In these example embodiments, an initial cost of the mobile device may be reduced by having an internal memory having relatively small capacity; additional external memory may satisfy the demands of the software programmers and the users who request performance of multi-tasking in the mobile device similar to the performance of the personal computer.

The example embodiments may be used in arbitrary devices and in systems requiring a main memory or a system memory. The example embodiments may be particularly usefully implemented in the mobile devices requiring a small size and high multi-tasking.

The above-disclosed subject matter is to be considered illustrative and not restrictive, and the appended claims are intended cover all such modifications, enhancements, and other embodiments, which fall within the true spirit and scope of the disclosed embodiments. Thus, the invention is to be construed by the broadest permissible interpretation of the following claims and their equivalents, and shall not be restricted or limited by the foregoing detailed description.

What is claimed is:

1. A device comprising:
    a memory controller;
    a memory bus coupled to the memory controller;
    an internal memory directly connected to the memory controller through the memory bus; and
    an external memory connection unit configured to connect an external memory directly to the memory controller through a portion of signal lines in the memory bus, and configured to generate a flag signal indicating whether the external memory is connected to the external memory connection unit.

2. The device of claim 1, wherein a command-address bus of the memory bus is shared by the external memory and the internal memory when the external memory is connected to the external memory connection unit.

3. The device of claim 1, further comprising:
    a base substrate with an upper surface at which the memory controller and the internal memory are mounted,
    wherein the external memory is mounted at a bottom surface of the base substrate under the internal memory.

4. The device of claim 1, wherein the external memory connection unit includes:
    a flag pad to which a first voltage is applied, the first voltage being provided from the external memory when the external memory is connected to the external memory connection unit; and
    a resistor coupled between the flag pad and a second voltage, the flag signal being provided at a node between the resistor and the flag pad.

5. The device of claim 2, wherein the memory controller increases a driving strength of drivers configured to drive the command-address bus when the external memory is connected to the external memory connection unit.

6. A device comprising:
    a memory controller;
    a memory bus coupled to the memory controller;
    an internal memory directly connected to the memory controller through the memory bus; and
    an external memory connection snit configured to connect an external memory directly to the memory controller through a portion of signal lines in the memory bus, and configured to generate a flag signal indicating whether the external memory is connected to the external memory connection unit,
    wherein the internal memory communicates with the memory controller with a maximum data bus width in a base mode representing that the external memory is not connected to the external memory connection unit, and
    wherein the maximum data bus width is divided into a first data bus width and a second data bus width in a memory extension mode representing that the external memory is connected to the external memory connection unit such that the internal memory communicates with the memory controller with the first data bus width and the external memory communicates with the memory controller with the second data bus width.

7. The device of claim 6, wherein the data bus of the memory bus includes:
    one or more dedicated data lines configured to connect the internal memory to the memory controller in the base mode and the memory extension mode; and
    one or more variable data lines configured to connect the internal memory to the memory controller in the base mode and configured to connect the external memory to the memory controller in the memory extension mode.

8. The device of claim 6, wherein the internal memory and the external memory are configured to receive a common chip selection signal and the internal memory is configured to perform an initializing operation corresponding to the base mode or the memory extension mode in response to the flag signal.

9. The device of claim 6, wherein the internal memory and the external memory are configured to receive respective chip selection signals different from each other and the internal memory is configured to perform an initializing operation corresponding to the base mode or the memory extension mode in response to a command signal provided from the memory controller.

10. The device of claim 7, wherein each of the variable data lines includes a path converter configured to operate by a mechanical force that is caused when the external memory is mounted in the external memory connection unit by a user, the path converter including:
    a first conductor configured to form a conduction path between the internal memory and the memory controller in the base mode;
    a second conductor configured to form a conduction path between the external memory and the memory controller in the memory extension mode; and
    an insulator configured to block an electrical connection between the internal memory and the memory controller in the memory extension mode.

11. The device of claim 7, wherein each of the variable data lines includes a switch configured to perform a switching operation in response to the flag signal such that the switch forms a conduction path between the internal memory and the memory controller in the base mode and the switch forms a conduction path between the external memory and the memory controller in the memory extension mode.

12. The device of claim 7, wherein each of the variable data line includes a first line between the internal memory and the memory controller and a second line between the external memory and the memory controller, and
    wherein a first driver and a first reception buffer coupled to the first line are enabled in the base mode and a second driver and a second reception buffer coupled to the second line are enabled in the memory extension mode, in response to the flag signal.

13. A mobile device comprising:
    a system-on-chip including a memory controller;
    a memory bus coupled to the memory controller;
    an internal memory directly connected to the memory controller through the memory bus, the internal memory directly connected to the memory controller through signal lines of the memory bus; and
    an external memory connection unit configured to connect an external memory directly to the memory controller through a portion of the signal lines of the memory bus, and configured to generate a flag signal indicating whether the external memory is connected to the external memory connection unit.

14. The mobile device of claim 13, wherein a command-address bus of the memory bus is shared by the external memory and the internal memory when the external memory is connected to the external memory connection unit.

15. The mobile device of claim 13, wherein the internal memory communicates with the memory controller with a maximum data bus width in a base mode representing that the external memory is not connected to the external memory connection unit, and wherein the maximum data bus width is divided into a first data bus width and a second data bus width in a memory extension mode representing that the external memory is connected to the external memory connection unit such that the internal memory communicates with the memory controller with the first data bus width and the external memory communicates with the memory controller with the second data bus width.

16. The mobile device of claim 13, further comprising:
a base substrate with an upper surface at which the memory controller and the internal memory are mounted,
wherein the external memory is mounted at a bottom surface of the base substrate under the internal memory.

17. The mobile device of claim 13, wherein the external memory connection unit includes:
a flag pad to which a first voltage is applied, the first voltage being provided from the external memory when the external memory is connected to the external memory connection unit; and
a resistor coupled between the flag pad and a second voltage, the flag signal being provided at a node between the resistor and the flag pad.

18. The mobile device of claim 14, wherein the memory controller increases a driving strength of drivers configured to drive the command-address bus when the external memory is connected to the external memory connection unit.

* * * * *